(12) United States Patent
Sonoda et al.

(10) Patent No.: US 6,710,282 B2
(45) Date of Patent: Mar. 23, 2004

(54) METHOD AND APPARATUS FOR TWIN SPOTS PULSE LASER WELDING

(75) Inventors: Hirofumi Sonoda, Narashino (JP); Kenji Okuyama, Narashino (JP); Junichi Ibukuro, Narashino (JP); Takanori Yahaba, Wako (JP); Masato Takikawa, Wako (JP); Yasutomo Ichiyama, Tokyo (JP); Toshiyasu Ukena, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/316,900

(22) Filed: Dec. 12, 2002

(65) Prior Publication Data

US 2003/0121895 A1 Jul. 3, 2003

(30) Foreign Application Priority Data

Dec. 27, 2001 (JP) ......................................... 2001-397948

(51) Int. Cl.$^7$ ........................... B23K 26/20; B23K 26/24
(52) U.S. Cl. ............................. 219/121.63; 219/121.64; 219/121.77
(58) Field of Search .......................... 219/121.6, 121.63, 219/121.64, 121.73, 121.74, 121.75, 121.76, 121.77, 121.85

(56) References Cited

U.S. PATENT DOCUMENTS

| 4,691,093 A | * | 9/1987 | Banas et al. | ........... 219/121.63 |
| 5,690,845 A | * | 11/1997 | Fuse | ..................... 219/121.74 |

FOREIGN PATENT DOCUMENTS

| JP | 6-328277 | 11/1994 |
| JP | 10-314973 | 12/1998 |
| JP | 2000-351086 | 12/2000 |

* cited by examiner

*Primary Examiner*—Samuel M. Heinrich
(74) *Attorney, Agent, or Firm*—Arent Fox Kintner Plotkin & Kahn, PLLC

(57) ABSTRACT

A twin spots pulse laser welding apparatus is disclosed which is used for providing a defect-free weld in a butt welding gap. The welding apparatus comprises a YAG laser oscillator 6, a chopper circuit for controlling the value of the lamp current of the oscillator, a chopping controller 12, a control panel 10 and a pulse generator 11 for applying a lamp current base value Wb and a peak value Wp and a pulsating pulse to the controller, and a twin spots laser head 14 for converging a laser beam delivered from the YAG laser oscillator to two foci 20R, 20L which are distributed in x direction with a very small spacing therebetween. YAG laser beam delivered from the YAG laser oscillator 6 is guided through an optical fiber cable 9 to the laser head.

5 Claims, 3 Drawing Sheets

METHOD AND APPARATUS FOR TWIN SPOTS PULSE LASER WELDING

FIELD OF THE INVENTION

The present invention relates to the art of laser welding.

BACKGROUND OF THE INVENTION

Japanese Patent Application Laid-Open No. 328,277/1994 discloses a laser welding method in which a YAG laser torch is caused to travel at a given rate along members which are to be welded together while feeding YAG laser pulses to the torch through an optical fiber to form one welded spot per pulse, thus forming a train of welded spots at a given pitch along the members to be welded.

Japanese Patent Application Laid-Open No. 314,973/1998 discloses a laser machining apparatus which uses a composite laser beam to perform a high power welding at a high rate. At this end, YAG laser pulse and a continuous laser wave of a different variety are passed through a single or a plurality of optical fibers to feed a condenser lens of a machining head, which irradiates members to be welded.

Japanese Patent Application Laid-Open No. 351,086/2000 discloses a laser beam welding method in which laser pulses are projected for welding purpose at a pulse interval such that before a key-hole which is created by the projection of a preceding laser beam pulse to cause a local melting and evaporation of a member or members is closed, a succeeding laser beam pulse is projected to the key-hole.

In summary, YAG laser welding has features as mentioned below and is extensively used in the automatic welding process for automobiles.

1) A focused laser radiation is obtained and enables a welding operation with a low distortion and at a high rate;

2) Laser radiation absorption coefficient for metal materials is several times higher than for a $CO_2$ laser, thus allowing an efficient welding operation. Since the wavelength of the laser radiation is on the order of 1/10 that of $CO_2$ laser, attenuation caused by plasmas generated during the welding operation is reduced.

3) The laser radiation can be transmitted through a flexible optical fiber, and thus a handling is facilitated and the laser can be used with a multi-joint robot. The transmission to a location which is located as far as 100 meters is possible.

4) The laser radiation can be used in a time division manner or spatially split (or power divided) manner, and this allows the distribution of the laser radiation to a plurality of machining stations to achieve a high utilization efficiency.

On the other hand, the welding operation by using YAG laser alone involves the following issues:

1) YAG laser is used in the welding operation by condensing the beam radiation to achieve an increased power density. However, the condensed spot has a very small diameter on the order of $\phi 0.3$ to $\phi 0.1$ mm, and this causes the following inconveniences;

For butt welding, the presence of a gap between members to be welded which are disposed in abutment against each other (see FIG. 3a) allows the laser radiation to pass through the gap, causing weld defects. This imposes a severe demand on the cutting of an end face of a member to be welded where a weld is to be formed as well as on the manner of constraining parts of the members located adjacent to the weld.

For lap welding, the width of faying interface of a bead which extends from a top member (see FIG. 3b) to a bottom member is limited, preventing a satisfactory bonding strength from being obtained.

For fillet welding, a satisfactory depth of fusion (see FIG. 3c) cannot be obtained in the similar manner as mentioned above, preventing a satisfactory bonding strength from being obtained.

2) YAG laser apparatus requires a high equipment cost or initial cost, and therefore, where a plurality of equipment must be provided as in an automobile production line, a prohibitive installation cost results.

It is known to divide a single laser beam in an optical system which guides a laser radiation to a machining head as by the use of a prism so that a plurality of spots may be formed. For example, a pair of spots (or twin spots) may be defined across a weld line in order to avoid the occurrence of a pass-by as would occur in a single spot arrangement. This provides a technique which would improve the margin demanded for a butt welding gap. However, the division of the laser beam into a plurality of sub-beams results in a power for each spot which is equal to the laser output p divided by the number N of the spots. This means a reduction in the power delivered to each spot, and there arises a problem that there must be provided a laser having a higher output capability.

It is an object of the present invention to overcome problems mentioned above by enabling a defect-free laser welding in a butt welding operation without demanding a higher precision in the butt welding gap maintained, achieving a greater width of facing interface and a greater depth of fusion in the lap welding operation and the fillet welding operation, respectively, by a laser welding and obtaining a higher joint strength in either instance.

SUMMARY OF THE INVENTION

The present invention overcomes the described problems by the use of a pulse laser output to twin spots. According to the twin spots pulse laser welding method, (1) there can be achieved a deep depth of fusion with a peak output even if a laser having a mean output which is equivalent to a continuous wave laser is used;

(2) For example, when welding together aluminium members, an irradiation laser power equal to or greater than 2 KW is required for a $\phi 0.6$ mm spot because of the surface oxide film and the reflectivity. However, when pulses are used, a welded operation is made possible using a laser having a smaller output. By way of example, when a laser having a 3 KW is used, the output distributed to twin spots result in 1.5 KW per spot, which prevents a welding operation from being performed. However, if the laser is operated such that it provides 4 KW output during one-half period and to provide 2 KW output during the remaining half period, the mean output of the time sequence will be equal to 3 KW, allowing 2 KW to be supplied to one spot for an interval which is equal to one-half period. This permits a deep depth of fusion to be produced, thus increasing the joint strength;

(3) For lap welding operation, a width of faying interface which is equivalent to the sheet thickness will be normally required in view of the required welding strength, but such width cannot be maintained with the single spot. On the other hand, according to the continuous twin spots welding operation, even though the width of molten top can be increased, the depth of fusion is reduced and the welds in the faying interface are separate from each other, also making it difficult to maintain the welding strength. However, when the pulse output is combined with the twin spots welding, the fusion increases in depth periodically, and in the deep portion, the molten pools produced by the adjacent two spots overlap each other to increase the width of the faying interface, allowing the desired welding strength to be secured.

Above and other objects and features of the present invention will become apparent from the following description of an embodiment thereof with reference to the drawings.

DESCRIPTION OF PREFERRED EMBODIMENT

Figure 1:
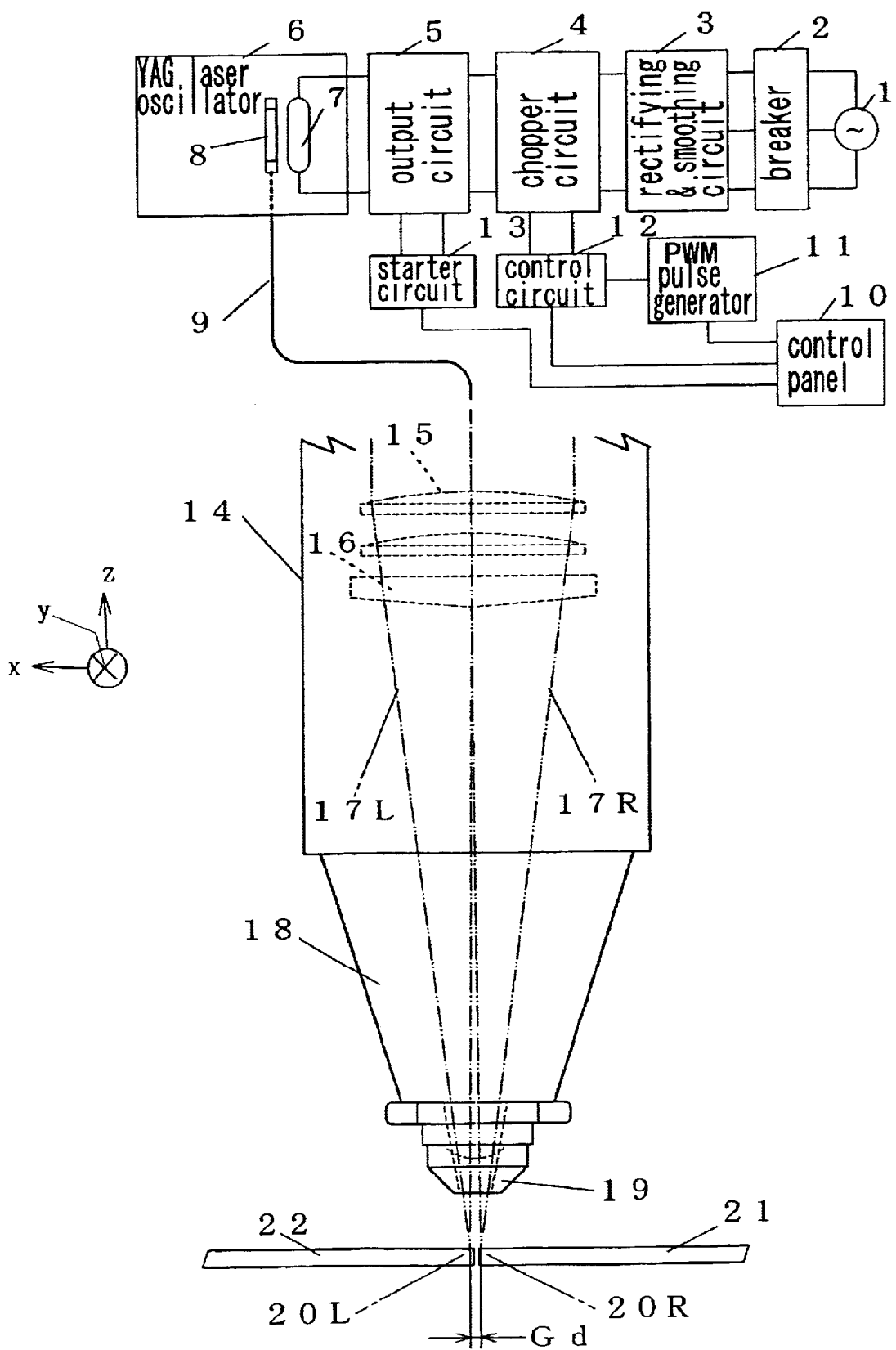
FIG. 1 is a block diagram of one embodiment of the twin spots pulse laser welding apparatus according to the present invention.

Referring to FIG. 1, an a.c. source 1 feeds a three phase alternating current through a breaker 2 to a rectifying and smoothing circuit 3. The rectifying and smoothing circuit 3 rectifies the three phase alternating current into a constant d.c. voltage, which is then smoothed and is then applied to a chopper circuit 4. The chopper circuit 4 includes an internal step-up transformer which boosts the d.c. voltage which is chopped at high frequency and delivers the boosted voltage to a rectifying and smoothing output circuit 5. The input d.c. voltage is chopped in synchronism with a high frequency PWM pulse which is supplied from a control circuit 12. In this manner, a high frequency a.c. voltage is delivered to the rectifying and smoothing output circuit 5, which then rectifies and smoothes the high frequency a.c. voltage. However, it is to be noted that this smoothing action is only effective to smooth a high frequency d.c. current (or pulsating current), but has no smoothing action upon the frequency of a low frequency PWM pulse which is to be described later.

To initiate an irradiation by a YAG laser, a starter circuit 13 responds to a start command from a control panel 10 to cause the rectifying and smoothing output circuit 5 to apply a high frequency high voltage across feed lines to a krypton arc lamp 7 of a YAG laser oscillator 6, thereby starting the arc lamp 7. This starts an arc discharge.

A PWM pulse period T (which may be a period of 20 msec for a low frequency of 50 Hz) and a peak interval t (which may be 7 msec, for example, where a duty cycle D is defined as $D=(t/T)\times100\%$) which are determined by an operator are applied from the control panel 10 to the PWM pulse generator 11, which responds thereto by generating a low frequency PWM pulse having the period T and the peak interval t to be applied to the control circuit 12. A base level command value Wb and a peak level command value Wp which are determined by an operator are also supplied from the control panel 10 to the control circuit 12, which responds thereto by generating a high frequency PWM pulse having a duty cycle which is necessary to feed a lamp current equivalent to the peak level command value Wp to the krypton arc lamp 7 of the YAG laser oscillator 6 during the peak interval t of the low frequency PWM pulse and by generating a high frequency PWM pulse having a duty cycle which is necessary to feed a lamp current equivalent to the base level command value Wp to the arc lamp 7 during the base level interval (T−t) of the low frequency PWM pulse, thus applying these high frequency PWM pulses to the chopper circuit 4.

Within the chopper circuit 4, the input d.c. voltage is chopped in synchronism with the high frequency PWM pulse and is then applied across the primary winding of the step-up transformer in the chopper circuit 4. In response thereto, the rectifying and smoothing output circuit 5 energizes the arc lamp 7 with a lamp current having a current level which is substantially analogous to the low frequency PWM pulse. The YAG laser oscillator 6 contains a YAG laser rod 8, which is excited by the arc lamp to generate a laser pulse having a base level Wb KW, a peak level of Wp KW and a duty cycle of $D=(t/T)\times100\%$. This laser pulse is delivered through an optical fiber cable 9 to a YAG laser irradiation head 14.

The YAG laser irradiation head 14 includes a lens 15 which causes the YAG laser beam to be converged to one focus, and a prism 16 which splits the laser beam into a right-hand laser beam 17R and a left-hand laser beam 17L, which are equal halves in this embodiment. Both the right-hand and the left-hand laser beam 17R and 17L are passed through a nozzle body 18 and a copper tip 19 to be converged to a right focus 20R and a left focus 20F, respectively. It should be noted that the beams converged at the right and the left focus have substantially equal laser power.

In the present embodiment, a distance between the right focus 20R and the left focus 20L, or a spacing Gd in the x direction as indicated, is equal to 0.8 mm, and the YAG laser irradiation head 14 is moved in the y direction while maintaining the midpoint between the both foci in alignment with a butt line or a weld line between members 21 and 22 which are subject to a butt welding operation and which extends in the y direction or with the center of a gap between the both members.

Figure 2:
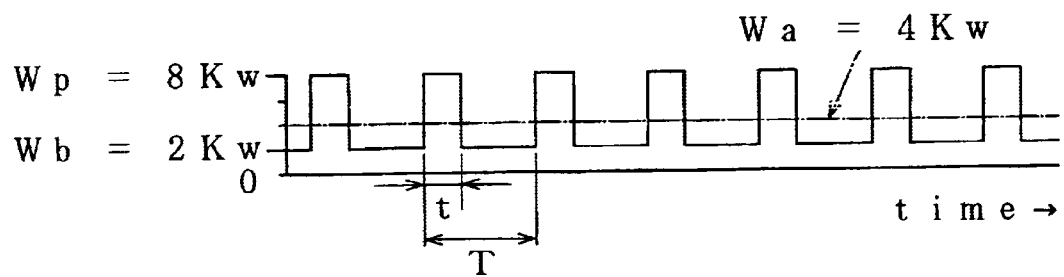
FIG. 2 is a timing chart schematically illustrating a change in the power emitted from a YAG laser oscillator 6 shown in FIG. 1.
Figure 3A:
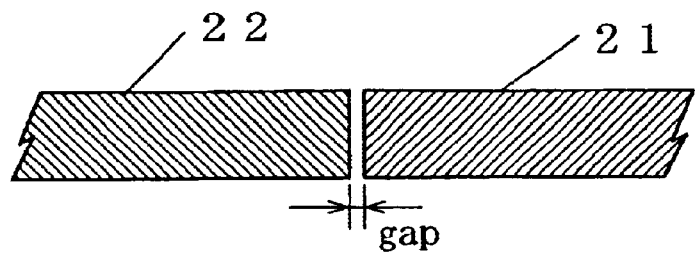
FIG. 3a is a cross section showing a butt welding gap formed between members 21 and 22 which are to be welded together.
Figure 3B:
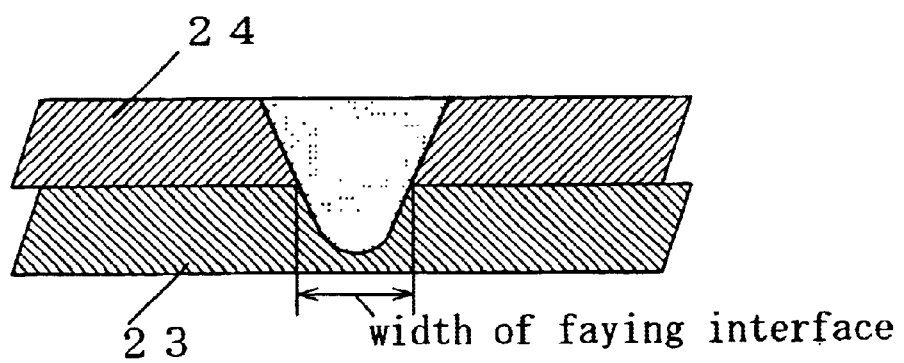
FIG. 3b is a cross section schematically showing the width of a faying interface of members 23 and 24 which are subject to a lap welding operation.
Figure 3C:
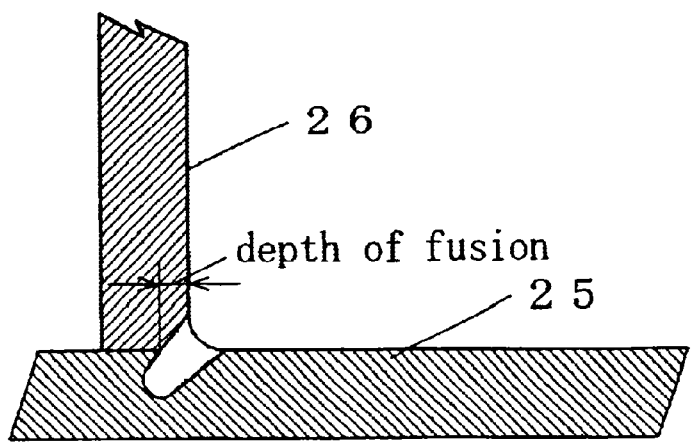
FIG. 3c is a cross section schematically illustrating a depth of fusion between members 25 and 46 which are subject to a fillet welding operation.

FIG. 2 schematically shows a laser pulse when a YAG laser pulse having a peak level of 8 KW and a base level of 2 KW is delivered from the YAG laser oscillator 6 having a rated output Wa equal to 4 KW. In the example shown, the duty cycle or $(t/T)\times100\%$ is equal to $(\frac{1}{3})\times100\%$, the pulse frequency is equal to 50 Hz and the peak interval t is equal to 20/3 msec. The laser power is equal to 4 KW during the peak interval (t) and equal to 1 KW during the base level interval (T−t) at each of the right focus 20R and the left focus 20L. It will be seen that at least one of the foci abuts against one of the members to be welded where a molten pool having a deep depth of fusion is created during the peak interval (t) to fill any gap which may be left between the members 21 and 22, and accordingly, it is assured that the both foci abut against either member or its molten metal to be dissipated therein without any waste of the laser power. Accordingly, if the depth of fusion may be shallow in depth during the base level interval (T−t), the depth of the fusion is deeper during the peak interval (t), allowing a defect-free joint having an increased strength to be obtained.

In the described embodiment, the laser output is chosen in the form of a low frequency, rectangular PWM pulse in view of the ease of set-up and adjustment of the peak level, the base level and the duty cycle (or total power). However, a similar effect can be achieved using any other known pulse configuration including a sinusoidal or triangular wave. Alternatively, a Q-switch may be used to form pulses. While the above description deals with a butt welding operation, it should be understood that the present invention can be equally applied to a lap welding and a fillet welding operation to achieve a similar effect.

The use of the twin spots in accordance with the present invention in the manner mentioned above assures that during the butt welding operation, either one of the spots never fails to abut against either member, and accordingly, if the laser power is dispersed between the twin spots, a deep depth of fusion is realized by the higher power level which occurs during the peak interval to allow a resulting molten pool to fill the butt welding gap, with consequence that the twin spots always abut against either member or its molten metal to be dissipated in these members without causing any waste in the laser power. If the depth of fusion is shallow during the base level interval, a greater depth of fusion is assured during the peak interval, allowing a defect-free joint having an increased strength to be obtained.

While a preferred embodiment of the present invention has been shown and described above, a number of changes and modifications therein are possible. Accordingly, it is not intended that the invention be limited to the specific construction or arrangement disclosed herein, but that the right is reserved to all changes and modifications coming within the scope of the invention defined by the appended claims.

What is claimed is:

1. A twin spots pulse laser welding method comprising the steps of providing a twin spots laser head which converges a laser beam to two foci which are distributed in x direction with a very small spacing therebetween;

positioning members to be welded together in the x direction such that a weld line between the members which extends in y direction is straddled by the two foci;

moving one of the twin spots laser head and the members in the y direction;

and supplying a pulsating current as a lamp current for a laser oscillator which delivers the laser beam to the twin spots laser head, the pulsating current having a peak level which is sufficient to produce a desired depth of fusion.

2. A twin spots pulse laser welding method according to claim 1 in which the pulsating current fed as the lamp current comprises a substantially rectangular pulse providing a pulsating current having a rated output Wa defined as below;

$$Wa = Wp \cdot t/T + Wb \cdot (T-t)/T$$

where Wp represents a peak output, t a peak output interval during one period of the pulsating current, T the period of the pulsating current and Wb a base output.

3. A twin spots pulse laser welding apparatus comprising a laser oscillator;

current control means for controlling the value of a lamp current of the laser oscillator;

lamp current command means for applying a lamp current base value, a peak value and the period of the pulsating current to the current control means;

and a twin spots laser head for converging a laser beam which is delivered from the laser oscillator to two foci which are distributed in x direction with a very small spacing therebetween.

4. A twin spots pulse laser welding apparatus according to claim 3 in which the laser oscillator comprises a YAG laser oscillator, and further comprising an optical fiber cable for guiding YAG laser beam which is delivered from the YAG laser oscillator to the laser head.

5. A twin spots pulse laser welding apparatus comprising a laser oscillator;

a pulse generator for generating a low frequency PWM pulse having a period T and a duty cycle D which are determined by an operator;

a control circuit for generating a high frequency PWM pulse having a duty cycle which corresponds to a base level command value Wb and a peak level command value Wp which are determined by an operator, the high frequency PWM pulse having a high duty cycle which corresponds to the peak level command value Wp during the peak interval t of the low frequency PWM pulse and having a low duty cycle which corresponds to the base level command value Wb during a base level interval (T−t);

a chopper circuit for chopping a d.c. voltage in synchronism with the high frequency PWM pulse and boosting it;

a rectifying and smoothing output circuit for rectifying and smoothing a boosted high frequency output from the chopper circuit to feed the laser oscillator;

and a twin spots laser head for converging a laser beam delivered from the laser oscillator to two foci which are distributed in a direction which traverses a boundary between two members which are to be welded together with a very small spacing therebetween.

\* \* \* \* \*